Feb. 17, 1942.  L. HAREL  2,273,794

PISTON PACKING

Filed May 9, 1938

Inventor:
L. Harel
By: Glascock Downing & Seebold
Attys.

Patented Feb. 17, 1942

2,273,794

UNITED STATES PATENT OFFICE 2,273,794

PISTON PACKING

Lucien Harel, Barcelona, Spain

Application May 9, 1938, Serial No. 206,933
In Germany May 18, 1937

7 Claims. (Cl. 309—7)

The present invention relates to piston rings and more particularly pertains to a plurality of rings for preventing leakage through the space between the ends of one of the rings.

The pistons of internal combustion engines and compressors are provided with piston rings which through their own spring force bear against the wall of the cylinder. As the piston must always slide in the cylinder with a certain amount of clearance, there is always a leaky place at the joint of the piston ring, through which the gaseous or liquid medium can pass from one side of the piston to the other. Even the employment of several piston rings cannot overcome this disadvantage.

It has also already been proposed to use two piston rings, one of which embraces the other and the joints of which were offset with respect to one another. But even this arrangement cannot remove the defect of leakage, as a joint in the piston rings will in the narrow space between piston and cylinder wall always be impinged on by the pressure medium which enters the space, so that the gas or the liquid can pass through at the back of the piston rings between the latter and the piston.

In order to obviate this defect the elastic piston ring which is slit at one place is disposed in a groove of a rigid, unslit ring embracing it, which latter ring is itself pressed against the wall of the cylinder at the slit place of the piston ring.

This arrangement has the advantage that the slit place of the piston ring cannot be reached by the pressure medium in the axial direction of the cylinder.

A suitable arrangement for ensuring this advantage is, that the piston ring and the ring embracing it from the inside are forced radially outwards in opposite directions by springs, the springs always acting in such a manner that they press the ring embracing the piston ring from the inside with a U-shaped groove with the greatest force against the cylinder wall at the slit place of the piston ring.

Figure 1:
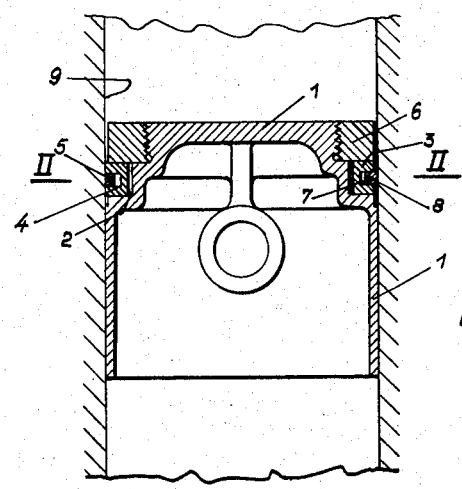
Figures 2, 3:
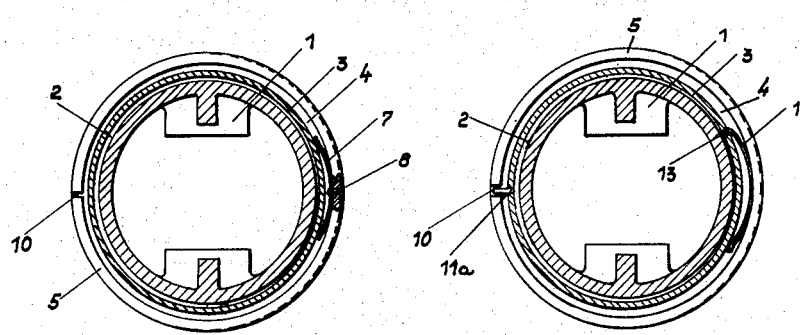
Figure 4:
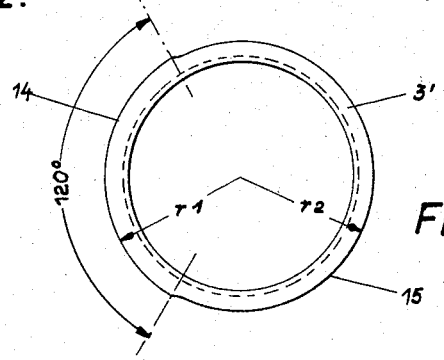

The arrangement according to the invention is illustrated by way of example in the accompanying drawing, in which:

Fig. 1 is a section through a piston and cylinder, only a single piston packing ring according to the invention being provided, Fig. 2 a section through the piston on line II—II of Fig. 1, Fig. 3 a similar section of a modified arrangement and Fig. 4 a plan view of a special form of the ring which embraces the piston ring from the inside.

The piston 1 preferably has at its upper end a reduced part which may be slightly conical. In this part a ring-shaped groove 2 is provided. In the example shown in Fig. 1 the groove 2 is formed by a ring 6 threaded on to the piston 1.

In the ring-shaped groove 2 is arranged a ring 3 of U-shaped cross-section, which embraces the piston ring 5 from the inside and in the ring-shaped groove 4 of which the piston ring 5 rests. The ring 3 has only a very small lateral clearance, while the clearance in the radial direction is considerably greater. The piston ring 5 also has only small lateral clearance in the groove 4, but is capable of considerably greater radial motion with respect to the ring 3.

According to Figs. 1 and 2 there is arranged between the piston ring 5 and the ring 3 a radially acting spring 7 which is fixed to the piston ring 5 by means of a pin 8. This pin 8 is positioned on the piston ring 5 at the side diametrically opposite the slit 10, so that the spring 7 constantly seeks to press the ring 3 elastically against the cylinder wall at the slit side of the piston ring 5. In this case the piston ring 5 can freely adjust or displace itself circularly in the ring 3, but the ring 3 will always be pressed against the cylinder wall at the slit place 10 of the piston ring.

According to Fig. 3 a spring 11 is fixed with a hook 13 to the bottom of the groove 4 of the ring 3. In this case the spring 11 can alter its positions with respect to the piston ring 5, so that the piston ring 5 must be secured against turning with respect to the ring 3. For this purpose there may be provided on the ring 3 a pin 11a, which preferably engages in a recess at the slit. The pin 11a may also be arranged at another place of the ring 3, but this place must be so selected that the spring 11 will always be effective diametrically opposite the slit 10, so as to press the ring 3 against the cylinder wall 9 at this place.

In all these constructional forms provision is thus always made for the ring 3 to be pressed against the cylinder wall 9 at the slit place 10 of the piston ring 5.

The external diameter of the ring 3 is made such that it will fit almost in a gas-tight manner in the cylinder bore. It therefore bears, when displaced to one side in the piston, with a great part of its periphery always against the cylinder wall. This contact surface may correspond to a maximum of 180°. It may be useful to dimension this contact surface within the limits of 120° to 180°. A contact surface corresponding to 120° has been found to be particularly advantageous. In Fig. 4 the part 14 of the periphery of the ring 3', which corresponds to 120°, corresponds to radius $r^1$ of the cylinder bore 9. The part 15 has a smaller radius $r^2$. The transition from the peripheral part of greater radius to that of smaller radius may be gradual or sudden.

A plurality of such piston ring packings may be provided on the piston 1. In place of the leaf springs 7 and 11 as shown other suitable resilient means may be employed.

What I claim is:

1. A piston packing arrangement comprising in combination an elastic piston ring having a slit at one place, a rigid unslit ring having a groove for embracing the slit piston ring from the inside and having a portion of its periphery within a range of 120° and 180° adapted to the working surface of the cylinder.

2. A piston packing arrangement comprising in combination, a piston ring having a transverse slit thereon, a second piston ring having a circumferentially extending groove therein embracing the first piston ring from the inside, and said second piston ring having at least a 120° portion of the periphery thereof adapted for engagement with the wall of a cylinder.

3. A packing arrangement for the piston of a cylinder wherein the piston is provided with a circumferentially extending groove comprising, a continuous rigid piston ring having substantially straight parallel lateral edges and of a substantially uniform width throughout the circumference thereof slightly smaller than said groove arranged in said groove for free radial displacement therein, said ring having a circumferentially extending recess therein facing the cylinder, a second split piston ring of smaller cross-section than said recess mounted in said recess for free radial displacement therein, and yieldable means urging a portion of the continuous ring adjacent the split of the second ring radially outward with respect to the piston and the second ring.

4. A packing arrangement for a piston of a cylinder wherein the piston is provided with a circumferentially extending groove concentric with the axis of the piston comprising, a continuous piston ring having straight lateral edges and of a substantially uniform cross-section throughout the circumference thereof which is slightly smaller than said groove arranged in said groove for free radial displacement therein, said ring having a circumferentially extending recess therein facing the cylinder, a second split piston ring of smaller cross-section than said recess mounted in said recess for free radial displacement therein, and yieldable means interposed between the two rings pressing the continuous ring radially outwardly with respect to the piston against the cylinder at points adjacent the split of the second ring and urging the split ring radially outward with respect to the piston into engagement with the cylinder at points diametrically opposite the split of the second piston ring.

5. A packing arrangement for the piston of a cylinder wherein the piston is provided with a circumferentially extending groove comprising, a continuous laterally rigid piston ring of slightly smaller lateral width than said groove arranged in said groove for free radial displacement therein, said ring having a circumferentially extending recess therein facing the cylinder, a split elastic piston ring of smaller cross-section than said recess mounted in said recess for free radial displacement therein, and yieldable means interposed radially between the two rings pressing the continuous ring radially outwardly with respect to the piston and with respect to the elastic ring against the cylinder at points adjacent the split of the elastic piston ring and urging the split ring radially outward with respect to the continuous piston ring and radially outward with respect to the piston into engagement with the cylinder at points diametrically opposite the split of the elastic piston ring.

6. A packing arrangement for the piston of a cylinder wherein the piston is provided with a circumferentially extending groove comprising, a continuous relatively rigid ring having relatively straight substantially parallel lateral edges with a width smaller than said groove arranged in said groove for free radial displacement therein, said ring having a circumferentially extending recess therein facing the cylinder, a split elastic piston ring of smaller cross-section than said recess mounted in said recess for free radial displacement therein, and a relatively short spring arranged radially between the two rings pressing the continuous ring radially outwardly with respect to the elastic ring at points adjacent the split of the elastic piston ring and urging the split ring radially outward with respect to the continuous ring at points diametrically opposite the split of the elastic piston ring whereby a peripheral portion of the continuous ring covers said split.

7. A packing arrangement for the piston of a cylinder wherein the piston is provided with a circumferentially extending groove comprising, a continuous relatively rigid ring having straight lateral edges throughout the circumference thereof with a width slightly smaller than said groove arranged in said groove for free radial displacement therein, said ring having a circumferentially extending recess therein facing the cylinder, a split piston ring of smaller cross-section than said recess mounted in said recess for free radial displacement therein, and a spring interposed radially between the two rings and secured to said split ring diametrically opposite said split pressing the continuous ring radially outwardly with respect to the split ring against the cylinder at points adjacent the split and urging the split ring radially outward with respect to the continuous ring into engagement with the cylinder at points diametrically opposite the split whereby a peripheral portion of the continuous ring laterally covers said split.

LUCIEN HAREL.